(12) United States Patent
Espersen et al.

(10) Patent No.: US 9,671,616 B2
(45) Date of Patent: Jun. 6, 2017

(54) OPTICS SYSTEM WITH MAGNETIC BACKLASH REDUCTION

(71) Applicant: FLIR Systems, Inc., Wilsonville, OR (US)

(72) Inventors: Adam Espersen, Portland, OR (US); Kevin E. Jones, Portland, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 89 days.

(21) Appl. No.: 14/475,394

(22) Filed: Sep. 2, 2014

(65) Prior Publication Data

US 2016/0062133 A1 Mar. 3, 2016

(51) Int. Cl.
G02B 7/02 (2006.01)
G02B 27/64 (2006.01)
G02B 7/10 (2006.01)
G02B 7/04 (2006.01)

(52) U.S. Cl.
CPC ........... *G02B 27/646* (2013.01); *G02B 7/023* (2013.01); *G02B 7/04* (2013.01); *G02B 7/10* (2013.01); *G02B 7/102* (2013.01)

(58) Field of Classification Search
CPC .................................. G02B 7/102; G02B 7/04
USPC .......... 359/819, 822–824, 826, 827; 248/574
See application file for complete search history.

(56) References Cited

U.S. PATENT DOCUMENTS

| | | | | |
|---|---|---|---|---|
| 4,676,605 A | * | 6/1987 | Toda | G02B 7/04 359/696 |
| 7,671,311 B2 | * | 3/2010 | Ellison | F16M 11/10 244/3.1 |
| 7,808,731 B2 | * | 10/2010 | Ishimoda | G02B 7/102 359/694 |

* cited by examiner

*Primary Examiner* — Audrey Y Chang
(74) *Attorney, Agent, or Firm* — Haynes and Boone, LLP

(57) ABSTRACT

An imaging system may include a movable component that travels along a rail, the movable component being coupled to the rail by a carriage that includes a bearing and a magnetic portion configured to bias the bearing toward the rail. The imaging system may be suitable for use in a gimbal assembly.

18 Claims, 9 Drawing Sheets

OPTICS SYSTEM WITH MAGNETIC BACKLASH REDUCTION

CROSS-REFERENCES

This application incorporates by reference in their entireties for all purposes the following materials: U.S. Pat. Nos. 7,264,220; 7,671,311; 8,385,065; and PCT Publication No. WO 2012/170673.

INTRODUCTION

Imaging systems and optical devices that incorporate zoom and/or focus adjustment features typically have movable lens elements. These imaging systems may be suitable for use in gimbal systems, as well as in other types of systems such as cameras, telescopes, and/or binoculars. In these optical devices, one or more lens elements may be moved deliberately along a line of sight (LOS) (i.e., axially) to effect a magnification or focus change. Due to component backlash, lateral motion (e.g., shaking) may be experienced during the axial repositioning of a lens element, causing a condition known as "image jitter." Some imaging systems attempt to address the problem of image jitter by incorporating tight manufacturing tolerances. However, this method is not entirely effective, and is also expensive and technically challenging.

Optical devices (e.g., cameras and lasers), may be mounted to and used on support platforms using gimbal systems. For example, vehicles, such as aircraft, watercraft, and ground vehicles, may provide moving support platforms for gimbal systems. Whether moving or stationary, a gimbal system may enable a payload, such as an imaging system that includes one or more optical devices, to be accurately reoriented with respect to the support platform. As an example, the payload may include a camera that can be panned and tilted with respect to the support platform to survey or monitor a broad field of view.

SUMMARY

The present disclosure provides an optics system, including apparatus and methods, with a movable optics component including a stabilizing outrigger assembly having a magnetically preloaded carriage and guiderail configured to reduce image jitter caused by lateral lens motion.

Features, functions, and advantages may be achieved independently in various embodiments of the present disclosure, or may be combined in yet other embodiments, further details of which can be seen with reference to the following description and drawings.

DETAILED DESCRIPTION

Figure 1:
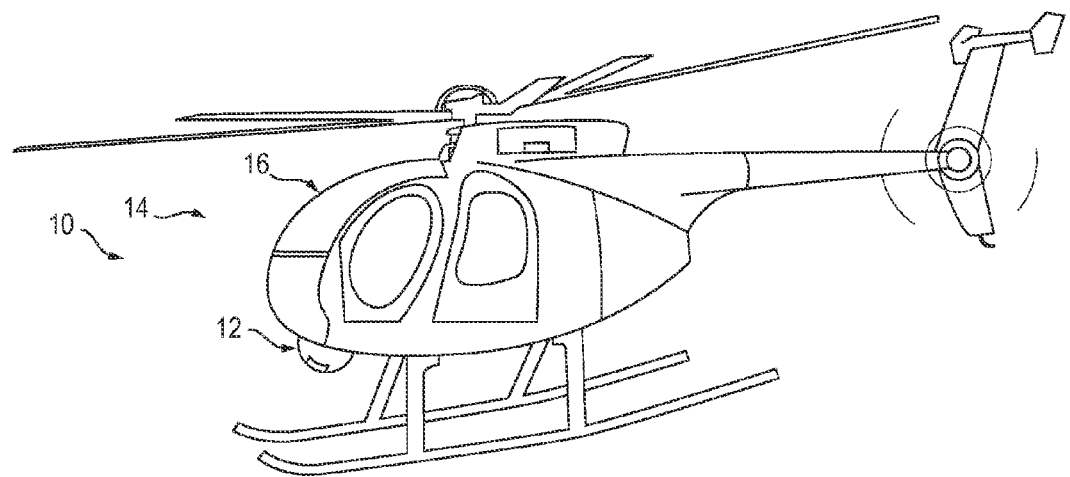
FIG. 1 is a view of an exemplary gimbal system including a turret unit mounted to an exterior of a support platform (namely, a helicopter), in accordance with aspects of the present disclosure.

The present disclosure provides an optics system (also referred to as an optical system), including apparatuses and methods, having a magnetically preloaded carriage assembly and corresponding guiderail, together configured to reduce backlash and image jitter. Such an optics system may be suitable for use in any imaging or other system in which image jitter during zoom and/or focusing is undesirable. For example, optics systems having magnetic preloading may be suitable for use in a gimbal system payload. Accordingly, gimbal systems are also described.

Various embodiments of an optics system with magnetic preloading are described below and illustrated in the associated drawings. Unless otherwise specified, an optics system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other examples of optics systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

An optics system for use in an imaging system in accordance with aspects of the present disclosure may include a movable element such as a lens carrier. The movable element may be positionable along an optical axis, such as for focusing and/or zooming operations. The movable element may be moved by a linear motor or other suitable device. The element may be moved along a guiderail to which the element is coupled by a linear bearing. The movable element may further be coupled to a so-called "outrigger" guiderail by a carriage assembly. The carriage assembly may reduce or eliminate backlash, and therefore unwanted lateral motion, by biasing a bearing surface toward the outrigger guiderail using a magnetic portion of the carriage (e.g., a permanent magnet). The outrigger guiderail may comprise ferromagnetic material to facilitate such biasing. This arrangement may be useful for high-precision imaging, and accordingly may be incorporated, for example, into the payload of a gimbal system.

A gimbal system may comprise a gimbal assembly pivotably connected to and supported by a support portion. The gimbal system further may comprise a payload, such as an optical detection device, which may be in communication with an electronic component. The payload may include an imaging system having optics with magnetic preloading as described above and in further detail below. The imaging system may include one or more optical systems configured to receive optical input and process the optical input via one or more sensors.

The payload, including the imaging system, may be supported by the gimbal assembly and pivotably orientable with respect to the support portion about a pair of nonparallel axes by controlled driven motion of the gimbal assembly, to provide pan and tilt movement of the payload.

Further aspects of the present disclosure are described in the following sections, including (I) definitions, (II) overview of an exemplary gimbal system, (III) support portions, (IV) gimbal assemblies, (V) payloads, (VI) support platforms, (VII) examples, components, and alternatives, and (VIII) advantages.

I. Definitions

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation.

Ultraviolet radiation—Invisible electromagnetic radiation having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible light—Visible electromagnetic radiation having wavelengths from about 360 or 400 nanometers, just longer than ultraviolet radiation, to about 760 or 800 nanometers, just shorter than infrared radiation. Visible light may be imaged and detected by the human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) radiation—Invisible electromagnetic radiation having wavelengths from about 700 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared range having wavelengths between about 3,000 and 5,000 nm (i.e., 3 and 5 µm) and between about 7,000 or 8,000 and 14,000 nm (i.e., 7 or 8 and 14 µm) may be especially useful in thermal imaging, because they correspond to minima in atmospheric absorption and thus are more easily detected (particularly at a distance). The particular interest in relatively shorter wavelength IR has led to the following classifications: (A) near infrared (NIR) (from about 780 nm to about 1,000 nm), (B) short-wave infrared (SW IR) (from about 1,000 nm to about 3,000 nm), (C) mid-wave infrared (MWIR) (from about 3,000 nm to about 6,000 nm), (D) long-wave infrared (LW IR) (from about 6,000 nm to about 15,000 nm), and (E) very long-wave infrared (VLWIR) (from about 15,000 nm to about 1 mm). Portions of the infrared range, particularly portions in the far or thermal IR having wavelengths between about 0.1 and 1 mm, alternatively or additionally may be termed millimeter-wave (MMV) wavelengths.

II. Overview of an Illustrative Gimbal System

FIG. 1 shows an exemplary gimbal system 10 including a turret unit 12 (also termed a gimbal apparatus) mounted to the exterior of a support platform 14. In the present illustration, support platform 14 is a vehicle, namely, a helicopter 16. In other examples, support platform 14 may include a boat or land-based vehicle. In some examples, turret unit 12 may be oriented differently, such as by mounting at a lower end rather than an upper end as shown in FIG. 1.

Figure 2:
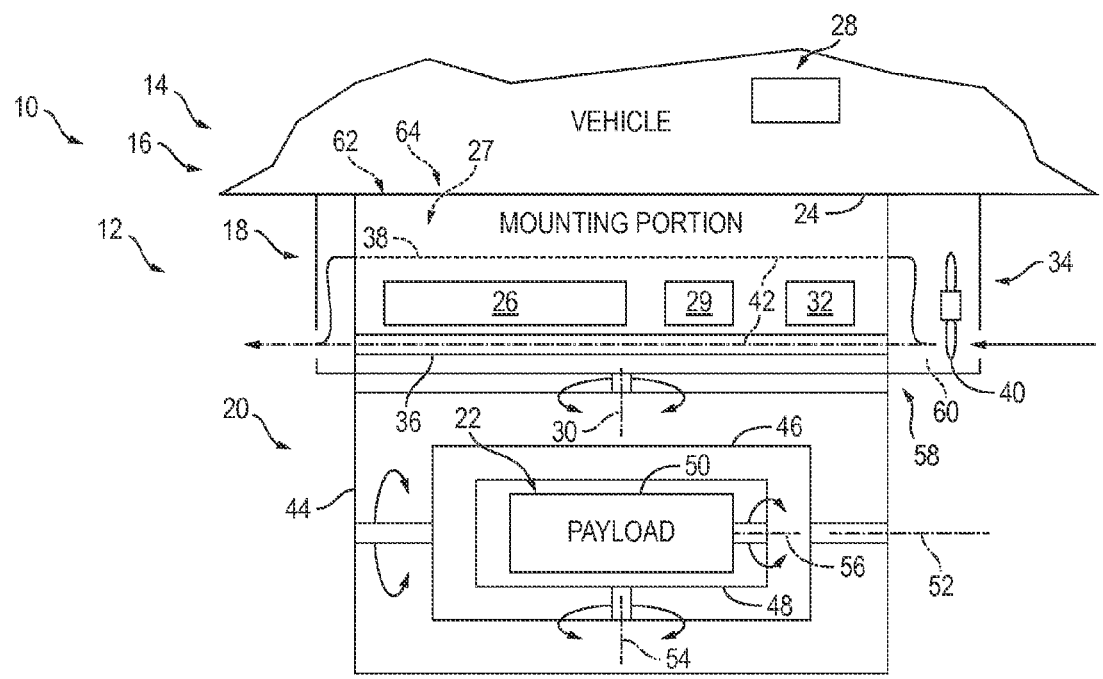
FIG. 2 is a schematic view of selected aspects of the gimbal system of FIG. 1, in accordance with aspects of the present disclosure.
Figure 3:
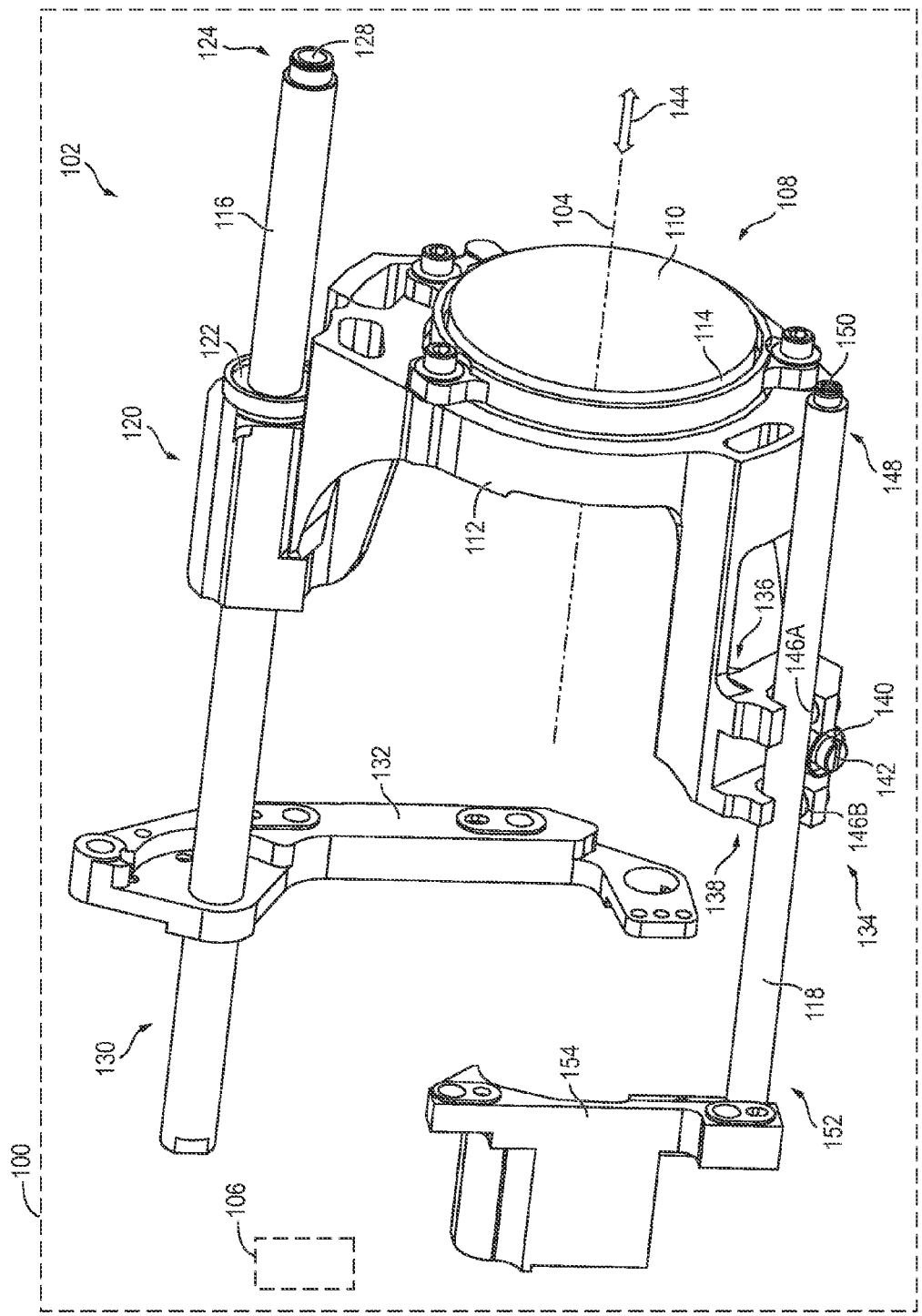
FIG. 3 is an isometric view of a portion of an illustrative imaging and optics system, taken from a front-right point of view, showing a lens carrier, guiderails, and mounting structures, in accordance with aspects of the present disclosure.

FIG. 2 shows a schematic view of selected aspects of system 10 and FIG. 3 shows a front elevation view of an exemplary embodiment of a portion of the system. Turret unit 12 may include a support portion 18 (which, in some cases, may be described as or may include a mounting portion and/or control portion), a gimbal assembly 20, and a payload 22. Support portion 18 may be attachable to support platform 14, and optionally may be fixed to the support platform, such that the support portion is at least substantially stationary with respect to the support platform. Gimbal assembly 20 may be connected to and supported pivotably by support portion 18. Thus, the support portion may function as a connecting bridge between support platform 14 and gimbal assembly 20. Payload 22, in turn, may be connected to and supported by gimbal assembly 20, and may be oriented controllably with respect to the support portion (and the support platform) by driven motion (e.g., motor-driven motion) of gimbal assembly 20.

Support portion 18 alone or collectively with gimbal assembly 20 may define a chamber 24 (i.e., an enclosed internal volume) in which internal components of the support portion may be disposed. The chamber may be occupied by the internal components and also by an internal fluid, such as an internal gas (e.g., air), in the remaining space, if any, adjacent the internal components. The chamber may be desiccated and is enclosed substantially (although not necessarily sealed hermetically), to protect the internal components from water vapor, dust, rain, snow, debris, insects, etc. These internal components may include one or more electronic components (e.g., one or more circuit boards, digital processors, other electronic devices, or the like), generally termed electronics 26. Electronics 26 may form at least a portion of a controller 27 of the turret unit. The controller may be in communication with a user interface unit 28, which may permit a user to communicate with the controller, such as by inputting commands to the controller and/or receiving data (e.g., image and/or video data) from the controller. Also, the support portion may comprise a drive assembly 29 to drive pivotal motion of the gimbal assembly with respect to the support portion about a first axis 30 (e.g., an azimuthal axis). The drive assembly may include a drive motor, one or more gears, and the like. Furthermore, the support portion may comprise a pointing sensor 32 (e.g., an encoder), a bearing, and the like.

Turret unit 12 may be utilized to aim payload 22, such as a camera, with respect to support platform 14. In particular, the turret unit may aim the payload by controlled pivotal movement of constituent gimbals 44, 46, 48, 50 of gimbal assembly 20 relative to support platform 14. For example, the angular orientation of the payload may be adjusted horizontally and vertically via the gimbals without changing the orientation of the support platform. Accordingly, the turret unit may allow one or more fixed and/or moving objects/scenes to be detected over time from a fixed and/or moving support platform 14.

Gimbal assembly 20 may include, among others, an outer gimbal 44 (also termed an azimuthal gimbal) and an inner gimbal 46 (also termed an elevational gimbal). Gimbal assembly 20 may be coupled pivotably to support portion 18 via outer gimbal 44, for controlled, driven pivotal movement of the entire gimbal assembly (and the outer gimbal) about first axis 30 (e.g., a generally vertical axis). Inner gimbal 46 may be pivotably coupled to support portion 18 through outer gimbal 44, such that the outer gimbal carries the inner gimbal. Inner gimbal 46 may undergo pivotal movement about a second axis 52 (e.g., a generally horizontal axis, also termed an elevational axis) that is nonparallel (e.g., transverse and/or orthogonal) to first axis 30. Payload 22 may be connected to support portion 18 via inner gimbal 46. Accordingly, pivotal movement of outer gimbal 44 and/or inner gimbal 46 may aim the payload in relation to first and second axes 30, 52. In some embodiments, the payload may be connected pivotably to inner gimbal 46 via one or more additional gimbals 48, 50 that pivot about one or more additional axes 54, 56. For example, controlled pivotal movement of outer and inner gimbals 44, 46 (major gimbals) may provide coarser adjustments to the orientation of payload 22, and controlled pivotal movement of additional gimbals 48, 50 (minor gimbals) may provide finer adjustments to the orientation (or vice versa).

Turret unit 12 may include a position control system 62. System 62 may operate to provide controlled positioning of the payload. The position control system may include controller 27, a driver(s) (e.g., a driver for each gimbal), and an encoder(s) (e.g., an encoder for each gimbal). The driver(s) may drive pivotal movement of each gimbal under the control of the controller. The encoder(s) may measure the position of the gimbal before, during, and/or after movement of each gimbal by the driver(s), to provide feedback information to the controller for further operation of the driver(s) and/or to allow the current position of a gimbal to be recorded and/or reported. The position control system further may include one or more gyroscopes to stabilize the position of the gimbals and/or the payload.

Turret unit 12 may include a power supply 64. The power supply may include any mechanism for supplying power, such as electrical power, to thermal regulation system 58, position control system 62, and electronics 26, among others. Suitable power supplies may generate, condition, and/or deliver power, including AC and/or DC power, in continuous and/or pulsed modes. Exemplary power supplies may include batteries, AC-to-DC converters, DC-to-AC converters, and so on.

Additional features and aspects that may be suitable for the gimbal system are disclosed in U.S. Pat. No. 7,671,311, which is incorporated herein by reference.

III. Support Portions

A support portion may be any part of a gimbal system that supports a gimbal assembly. In some cases, the support portion may include a mounting/control portion that connects a gimbal assembly to a support platform and/or that carries electronics providing one or more aspects of gimbal system control and/or data processing. The support portion may form an end region of a turret unit. Also, this portion may be unstabilized and may be termed a "skillet."

The support portion may support a gimbal assembly and may be connected directly to at least one gimbal and connected indirectly to one or more additional gimbals of the gimbal assembly. The support portion, in turn, may be attached to a support platform (see Section VI) or may rest upon a support platform without attachment thereto. The support portion may be mounted to a support platform via any suitable mechanism, with any suitable orientation. For example, when used with a vehicle, a support portion (and/or the corresponding turret unit) may be bottom-mounted, side-mounted, top-mounted, front-mounted, rear-mounted, externally mounted, internally mounted, and/or so on. Moreover, such mounting may be static or dynamic, for example, involving additional gimbal(s) to provide dynamic mounting. The support portion may carry and/or contain any suitable components of a turret unit, including a controller(s), power supply, electrical conduits or other electrical circuitry, a fan(s), and/or the like.

The support portion may have any suitable shape. In some embodiments, the support portion may be at least generally cylindrical. The support portion may be shaped at least generally as a disc.

IV. Gimbal Assemblies

A gimbal assembly, as used herein, is a hierarchical arrangement of two or more pivotable members (gimbals). A gimbal assembly may include a higher-order gimbal pivotally coupled directly to a support portion. The gimbal assembly also may include a lower-order gimbal pivotally coupled directly to the higher-order gimbal and indirectly to the support portion, such that the lower-order gimbal is carried by the higher-order gimbal. As a result, pivotal motion of the higher-order gimbal in relation to the support portion results in collective pivotal motion of both gimbals, whereas pivotal motion of the lower-order gimbal may be independent of the higher-order gimbal. The gimbal assembly further may include any suitable number of additional lower-order gimbals that are pivotally coupled directly to a relatively higher-order gimbal and/or that carry an even lower-order gimbal.

A gimbal assembly may be configured to rotate a payload about any suitable or desired number of axes, including 2, 3, 4, 5, 6, or more axes. In some embodiments, some of the axes of rotation may be collinear or coplanar. The axes of rotation typically are either orthogonal to one another or parallel to (including collinear with) one another, although this is not required. In some embodiments, parallel axes of rotation, or substantially parallel axes, can be used to provide increased precision, with a first level of rotation about a first axis providing coarser large-magnitude adjustments and a second level of rotation about a second axis (parallel or nonparallel) to the first axis providing finer small-magnitude adjustments.

Each gimbal of a gimbal assembly may be capable of any suitable pivotal motion. The pivotal motion may be a complete revolution (360 degrees) or less than a complete revolution. In some embodiments, the gimbal assembly may include a hierarchical arrangement of major and minor gimbal pairs. The major gimbal pair may be a pair of gimbals having a relatively larger range of angular motion (such as greater than about 90 degrees). The minor gimbal pair may be a pair of gimbals that are pivotally coupled to the major gimbal pair (and indirectly to the support portion) and having a relatively smaller range of angular motion (such as less than about 90 degrees).

Each gimbal of a gimbal assembly may be driven controllably by a driver. An exemplary driver that may be suitable is described in U.S. Pat. No. 7,561,784, issued Jul. 14, 2009, which is incorporated herein by reference.

V. Payloads

A payload is any device that is carried and aimed by a gimbal assembly. The payload may include one or more detectors and/or emitters, among others. A detector generally comprises any mechanism for detecting a suitable or desired signal, such as electromagnetic radiation, an electric field, a magnetic field, a pressure or pressure difference (e.g., sonic energy), a temperature or temperature difference (e.g., thermal energy), a particle or particles (e.g., high energy particles), movement (e.g., an inertial measurement device), and/or the like. An emitter generally comprises any mechanism for emitting a suitable or desired signal, such as electromagnetic radiation (e.g., via a laser), sonic energy, and/or the like. The payload generally is in communication with a controller that sends signals to and/or receives signals from the payload. The payload may be coupled (generally via a controller) to a display such that signals from the payload may be formatted into a visual form for viewing on the display. The present disclosure may be especially useful when the payload contains high heat-emitting components, such as lasers, radars, millimeter-wave (MMW) imagers, light detection and ranging (LIDAR) imagers, mine-detection sensors, and/or inertial measurement units (IMUs).

In some embodiments, the payload may form a detection portion (or all) of an imaging system. An imaging system generally comprises any device or assembly of devices configured to generate an image, or an image signal, based on received energy, such as electromagnetic radiation. Generally, an imaging system detects spatially distributed imaging energy (e.g., visible light and/or infrared radiation, among others) and converts it to a representative signal. Imaging may involve optically forming a duplicate, counterpart, and/or other representative reproduction of an object or scene, especially using a mirror and/or lens. Detecting may involve recording such a duplicate, counterpart, and/or other representative reproduction, in analog or digital formats, especially using film and/or digital recording mechanisms. Accordingly, an imaging system may include an analog camera that receives radiation (e.g., optical radiation) and exposes film based on the received radiation, thus producing an image on the film. Alternatively, or in addition, an imaging system may include a digital camera that receives radiation (e.g., optical radiation) and generates a digital image signal that includes information that can be used to generate an image that visually portrays the received radiation. Alternatively, or in addition, an imaging system may include an active component such as a laser to illuminate a scene and form an image from one or more reflections of the laser. "Imaging energy," as used herein, may include any type of energy, particularly electromagnetic energy, from which an image can be generated, including but not limited to ultraviolet radiation, visible light, and infrared radiation.

Suitable detectors for an imaging system may include (1) array detectors, such as charge-coupled devices (CODs), charge-injection devices (CIDs), complementary metal-oxide semiconductor (CMOS) arrays, photodiode arrays, microbolometers, and the like, and/or (2) arrays of point detectors, such as photomultiplier tubes (PMTs), photodiodes, pin photodiodes, avalanche photodiodes, photocells, phototubes, and the like. Detectors may be sensitive to the intensity, wavelength, polarization, and/or coherence of the detected imaging energy, among other properties, as well as spatial and/or temporal variations thereof.

The imaging system also may include optics (i.e., one or more optical elements). Exemplary optical elements may include (1) reflective elements (such as mirrors), (2) refractive elements (such as lenses), (3) transmissive or conductive elements (such as fiber optics or light guides), (4) diffractive elements (such as gratings), (5) subtractive elements (such as filters), and/or (6) electro-optic elements (such as a Kerr cell or a Pockels cell), among others.

The imaging system also may contain gyroscopes and/or other elements arranged to form an inertial measurement unit (IMU) on an optical bench. The IMU may be used to assess the pointing angle of the line-of-sight, as well as geo-location, geo-referencing, geo-pointing, and/or geo-tracking in earth coordinates.

In some embodiments, the imaging system may be capable of generating image signals based on reflection from a self-contained laser and/or other light or radiation source. The generated image may or may not contain range information. Such imagers may generate large amounts of heat. The present disclosure may enable the use and incorporation of light detection and ranging (LIDAR) systems, such as 3-D LIDAR systems, into gimbal systems in which the large amounts of associated heat would otherwise prevent their use.

In some embodiments, an imaging system may be capable of generating image signals based on two or more different types or wavebands of imaging energy. For example, the imaging system may be configured to generate a first image signal representative of visible light and a second image signal representative of infrared radiation. Visible light and infrared radiation are both types of electromagnetic radiation (see Definitions); however, they are characterized by different wavebands of electromagnetic radiation that may contain or reflect different information that may be used for different purposes. For example, visible light may be used to generate an image signal that in turn may be used to create a photograph or movie showing how a scene appears to a human observer. In contrast, infrared radiation may be used to generate an image signal that in turn may be used to create a heat profile showing heat intensity information for a scene. More generally, the imaging system may be used with any suitable set of first and second (or first, second, and third (and so on)) image signals, using any suitable wavelength bands. These suitable image signals may include first and second visible wavebands, first and second infrared wavebands, mixtures of visible, infrared, and/or ultraviolet wavebands, and so on, depending on the application.

In some examples, an imaging system may form composite images. The composite images may be straight combinations of two or more other images. However, in some cases, one or both of the images may be processed prior to or during the process of combining the images. Composite images may be formed for use in firefighting, aeronautics, surveillance, and/or the like, for example, by superimposing infrared images of hot spots, runway lights, persons, and/or the like on visible images.

The payload alternatively, or in addition, may include non-imaging systems, such as laser rangefinders, laser designators, laser communication devices, polarimeters, hyperspectral sensors, and/or the like.

Further aspects of imaging systems that may be suitable for the gimbal system of the present disclosure are described in the following patent, which is incorporated herein by reference: U.S. Pat. No. 7,515,767, issued Apr. 7, 2009.

VI. Support Platforms

The gimbal system of the present disclosure may include a turret unit supported by a support platform. A support platform, as used herein, generally refers to any mechanism for holding, bearing, and/or presenting a turret unit and its payload. The support platform may be moving, movable but stationary, or fixed in relation to the earth, and may be disposed on the ground, in the air or space, or on and/or in water, among others. In any case, the support platform may be selected to complement the function of the turret unit and particularly its payload.

The support platform may be movable, such as a vehicle. Exemplary vehicles include a ground vehicle (e.g., a car, truck, motorcycle, tank, etc.), a watercraft (e.g., a boat, submarine, carrier, etc.), an aircraft or airborne device (e.g., a fixed-wing piloted aircraft, pilotless remote-controlled aircraft, helicopter, drone, missile, dirigible, aerostat balloon, rocket, etc.), or the like.

The support platform may be fixed in position. Exemplary fixed support platforms may include a building, an observation tower, and/or an observation platform, among others. In some embodiments, the support platform may be a temporarily stationary movable support, such as a hovering helicopter and/or a parked car, truck, or motorcycle, among others.

A gimbal system with a moving, temporarily stationary, or fixed support platform may be used for any suitable application(s). Exemplary applications for a gimbal system include navigation, targeting, search and rescue, law enforcement, firefighting, and/or surveillance, among others.

VII. Examples, Components, And Alternatives

The following examples describe selected aspects of exemplary optics systems as well as related systems and/or methods. These examples are intended for illustration and should not be interpreted as limiting the entire scope of the present disclosure. Each example may include one or more distinct inventions, and/or contextual or related information, function, and/or structure.

Example 1

Imaging System Having a Magnetically Preloaded Guiderail Assembly

This example describes an exemplary imaging system including optics that have a magnetically preloaded carriage and guiderail assembly; see FIGS. 3-8.

An imaging system is generally indicated at 100 in FIG. 3. In this example, imaging system 100 includes optics system 102, various portions of which are shown in FIGS. 3-8. Optics system 102 may be referred to as input optics, and may include any suitable structure or assembly configured to gather, direct, filter, and/or focus radiation, such as visible and/or infrared light, incident generally along an input optical axis 104. For example, input optics may include an objective, a zoom lens, and/or electro-optic components.

More specifically, input optics 102 may comprise one or more optical elements that transmit incident radiation directly or indirectly to a sensor 108. An optical element is any structure or device that collects, directs, and/or focuses optical radiation and/or selectively reduces or blocks undesired radiation. An optical element may function by any suitable mechanism, such as refracting, reflecting, diffracting, and/or filtering, among others, optical radiation. Exemplary optical elements include lenses, mirrors, gratings, prisms, filters, beam splitters, transmissive fibers (fiber optics), or the like. Input optics 102 may define an optical path traveled by incident radiation to the sensor. The input optics may form an optical window through which optical radiation is received by an imaging assembly and/or camera. In exemplary embodiments, input optics 102 may include a multispectral objective capable of gathering and focusing radiation of various wavelengths, for example, multiple infrared wavelengths (any combination of near-IR/NIR, SWIR, MWIR, and LWIR), infrared and visible wavelengths, ultraviolet and visible wavelengths, or ultraviolet, visible, and infrared wavelengths, among others.

Input optics 102 may include one or more coatings (e.g., to reduce glare and/or reflections and/or for protection), a filter (e.g., to block undesired radiation), and/or the like. The coatings may include a hard coating, such as diamond or diamond-like carbon, on an exterior surface region of each objective lens to improve durability. The filter may be a wavelength filter, an intensity filter, a polarizing filter, a safety filter to block light from a laser (such as a laser weapon), or the like. Exemplary wavelength filters include a band-pass filter, a high or low cut-off filter, a notch filter, or any combination thereof, among others. The filter may block only part of a spectral range, such as blocking only part of the spectral range of infrared radiation, only part of the LWIR range (an LWIR filter), only part of the MWIR range (an MWIR filter), only part of the SWIR range (an SWIR filter), only part of the visible range (a visible light filter), and so on. The filter may be disposed or disposable on the optical path that incident radiation travels to the sensor, and thus is interposed or interposable between an observed scene and the sensor.

Sensor 106 may include any suitable structure, device, and/or mechanism configured as an image sensor for detecting images formed by the input optics on the sensor and converting the images into a representative video signal. More specifically, a sensor may be any device configured to detect radiation of interest (such as a visible image formed by input optics 102) and to convert the detected radiation into a signal representative of the detected radiation or image. A sensor may create a video signal by detecting a series of images over time, such as at a constant rate of image detection. A sensor generally includes a two-dimensional array of photosensitive elements or pixels. A sensor may, for example, include a cooled or uncooled infrared sensor (such as a focal plane array or microbolometer), a visible light sensor (such as a CCD or CMOS device), or the like.

In some examples, multiple sensors 106 may be set or adapted to detect the same type of optical radiation and/or the same wavelength bands (spectral ranges) of that type of optical radiation (e.g., among others, ultraviolet sensors, visible light sensors, infrared sensors (each detecting SWIR, MWIR, and/or LWIR). Alternatively, sensors may be set or adapted to detect different wavelength bands (e.g., among others, an SWIR sensor and an LWIR sensor, an SWIR sensor and an MWIR sensor, an MWIR sensor and an LWIR sensor, a visible light sensor and an infrared (SWIR, MWIR, and/or LWIR) sensor, an ultraviolet sensor and a visible light sensor, an ultraviolet sensor and an infrared sensor, and so on. One or more of the sensors also may simultaneously detect multiple wavelength bands (e.g., among others, SWIR and LWIR, MWIR and LWIR, or one or more infrared bands and visible). Multispectral sensors may allow greater flexibility. In some examples, a first sensor 106 may include a high resolution, color, visible light sensor, and a second sensor 106 may include a very sensitive, low-light, monochrome (visible and NIR) sensor. Each sensor 106, in functional combination with input optics 102, may be described as a camera or a collector.

In some embodiments, sensor 106 may include a color high-definition CCD to provide high-resolution color imagery in daylight. Color high-definition CCD cameras may not be very sensitive, resulting in poor low-light performance. Accordingly, another sensor 106 may include a monochrome low light sensor that can be used at twilight or at night. This camera (either an EMCCD or an sCMOS camera) has lower resolution than the color camera and is monochrome only. However, much better low light performance is provided (2-3 orders of magnitude) than the color camera. The system may be configured to automatically switch to the low light camera when conditions become too dark for the color camera. In some embodiments, more than two cameras (e.g., three or four, or more) may be included.

Figure 4:
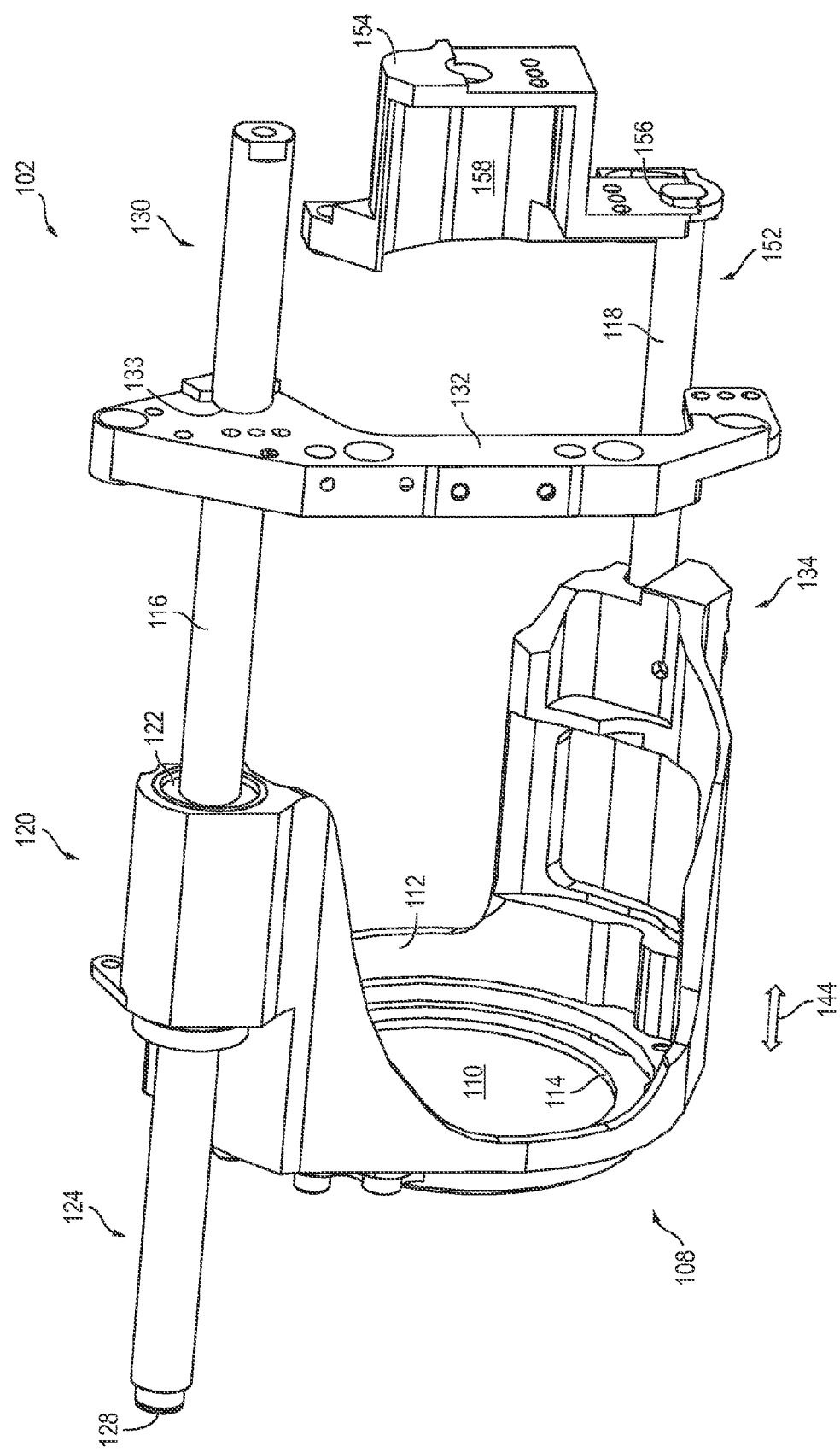
FIG. 4 is an isometric view of the system of FIG. 3, taken from a rear-left point of view.
Figure 5:
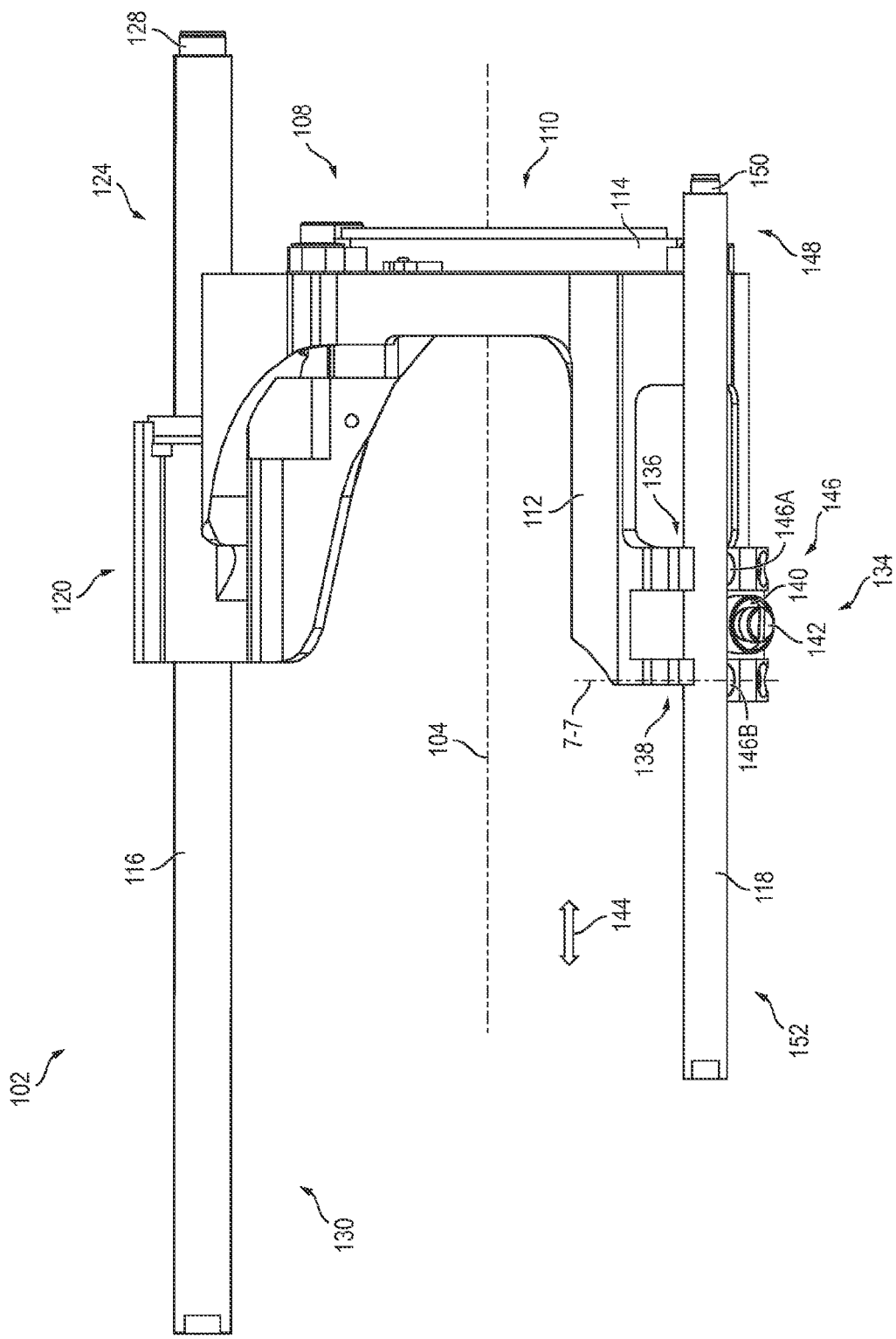
FIG. 5 is a side elevation view of the system of FIG. 3, taken from the right side of the apparatus.

In the example shown in FIGS. 3-5, optics system 102 includes a zoom lens assembly 108. Lens assembly 108 includes a lens 110 mounted to a movable lens carrier 112 by a lens cell 114. Lens carrier 112 moves along optical axis 104, riding on one or more stationary shafts, such as guiderails 116 and 118. Typically, at least two guiderails are used, to prevent roll and maintain collinearity and/or coaxiality of system components.

Guiderail 116 may include any suitable structure configured to provide a linear bearing surface for movement of lens carrier 112. For example, guiderail 116 may include a cylindrical shaft, a square shaft, a rectangular shaft, or any other suitable cross sectional shape. A linear bearing assembly 120 may be attached to, or unitary with lens carrier 112, such that a cylindrical bushing 122 of linear bearing assembly 120 rides on guiderail 116. Linear bearing assembly 120 may be operatively connected to a drive mechanism for moving the lens carrier along guiderail 116. The drive mechanism (not shown) may include any suitable linear actuator, such as a linear motor, a lead screw, a rack and pinion system, and/or the like.

Figure 6:
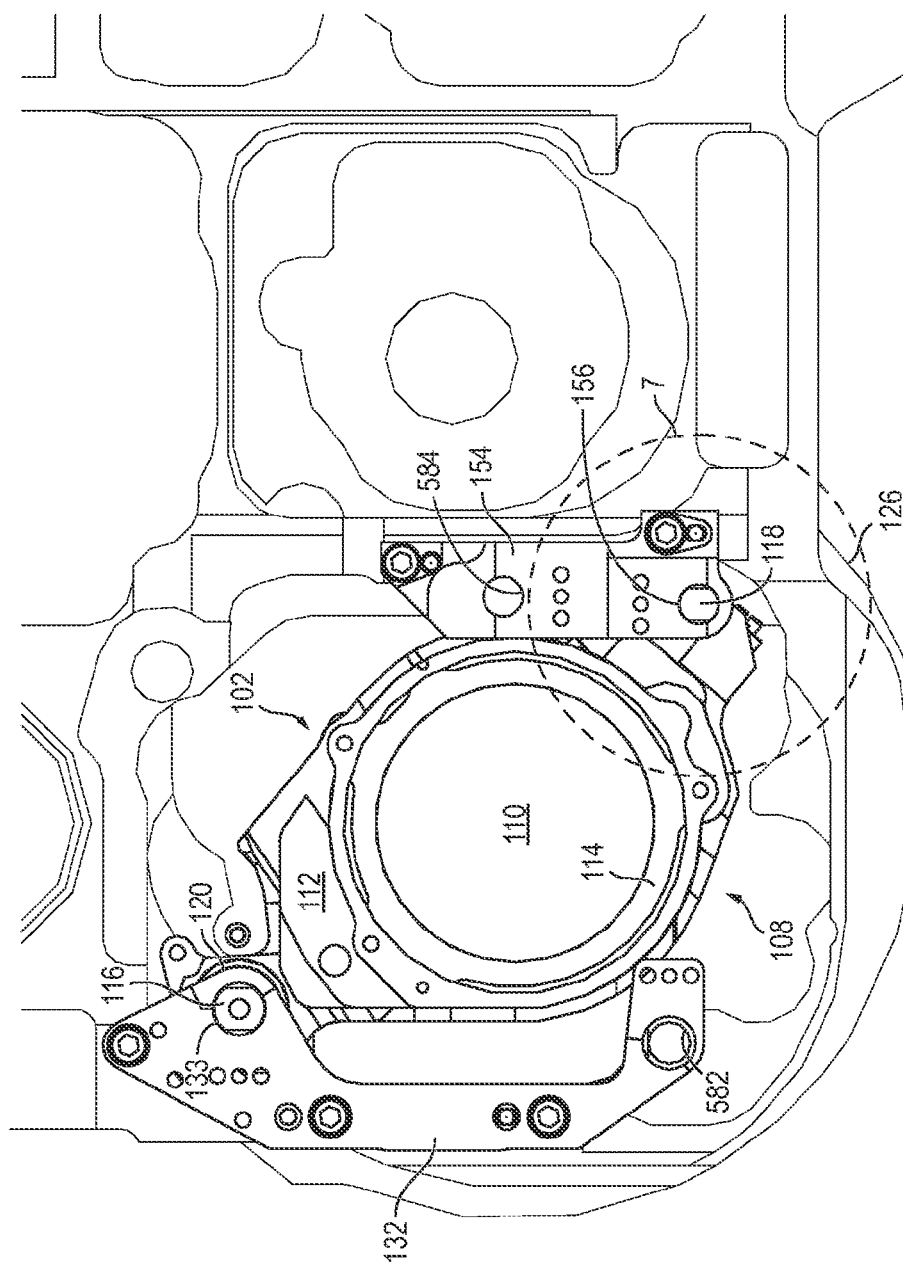
FIG. 6 is a rear elevation view of the system of FIG. 3, mounted to an illustrative housing or frame.

Guiderail 116 may be supported at a first or front end portion 124 by a fixed connection to a housing 126 (an example of which is shown in FIG. 6). For example, front end portion 124 may be bolted directly to a flange or support member of housing 126 by a bolt or cap screw 128. Housing 126 may also be referred to as an optical bench, and may comprise a portion of a payload as described above regarding gimbal systems. In other examples, housing 126 may include any stationary or relatively stationary structure to which the optics system is mounted (e.g., a building, a camera housing, etc.). Accordingly, movable optics components such as lens carrier 112 may be "movable" with respect to the housing and components attached thereto (e.g., guiderails 116 and 118). Housing 126 may move during pointing and other gimbal operations, but may be considered stationary and used as a reference frame for movable optics components described herein.

Guiderail 116 may be supported at a second or rear end portion 130 by a support bracket 132. Support bracket 132 may be a first support bracket, and may be referred to as a left support bracket, because it is on the left side of the optics system when viewed from the rear. Support bracket 132 may include any suitable mounting structure configured to be mounted to housing 126 and to support an end of guiderail 116. For example, bracket 132 may be bolted to housing 126, as shown in FIG. 6. An aperture 133 in support bracket 132 may be sized and shaped to receive end portion 130. Accordingly, guiderail 116 may be supported radially by bracket 132, while allowing some relative axial motion to accommodate thermal expansion and the like.

Guiderail 118 may be spaced circumferentially from guiderail 116 to provide stability. Guiderail 118 may be referred to as a second guiderail and/or an outrigger or outrigger guiderail. Either guiderail may be referred to as a guide shaft. Guiderail 118 may include any suitable structure configured to provide a second linear bearing surface for movement of lens carrier 112. Guiderail 118 may include any suitable cross sectional shape. For example, guiderail 118 may include a cylindrical shaft. A carriage assembly 134 may be attached to, or unitary with lens carrier 112 in a position generally opposite that of linear bearing assembly 120. Carriage assembly 134 may include any suitable structure configured to ride on guiderail 118 to provide stability and prevent lateral motion during axial repositioning of the lens carrier.

In the example shown in FIGS. 3-8, carriage assembly 134 includes two sets of jaws, 136 and 138, having a roller bearing 140 disposed between them and attached to the carriage assembly by a shoulder bolt 142. Roller bearing 140 is offset such that shaft 118 may pass through the mouths of jaws 136 and 138 while riding on roller bearing 140. Jaws 136 and 138 may also be referred to as retention features, fingers, and/or retention jaws. Jaws 136 and 138 may include any suitable structure configured to ensure that guiderail 118 remains adjacent to roller bearing 140. In general, jaws 136 and/or 138 may not be in physical contact with guiderail 118 during operation. Instead, roller bearing 140 contacts guiderail 118, providing as little frictional resistance as practicable as the lens carrier smoothly moves along axis 104 in a direction indicated by arrows 144. Jaws 136 and 138 may be referred to as retention jaws. More or fewer retention jaws may be present, as described in some examples below. Jaws such as jaws 136 and 138 may function to retain guiderail 118 by acting as a physical barrier, preventing the guiderail from dislodging completely. For example, an overload condition may result in acceleration levels that cause roller 140 to lose contact with guiderail 118. In such conditions, retention jaws and the guiderail may come into contact with each other, preventing further dislocation. When conditions return to a normal range, the system can then return to a state where the roller bearing is again engaged with the guiderail.

Figure 7:
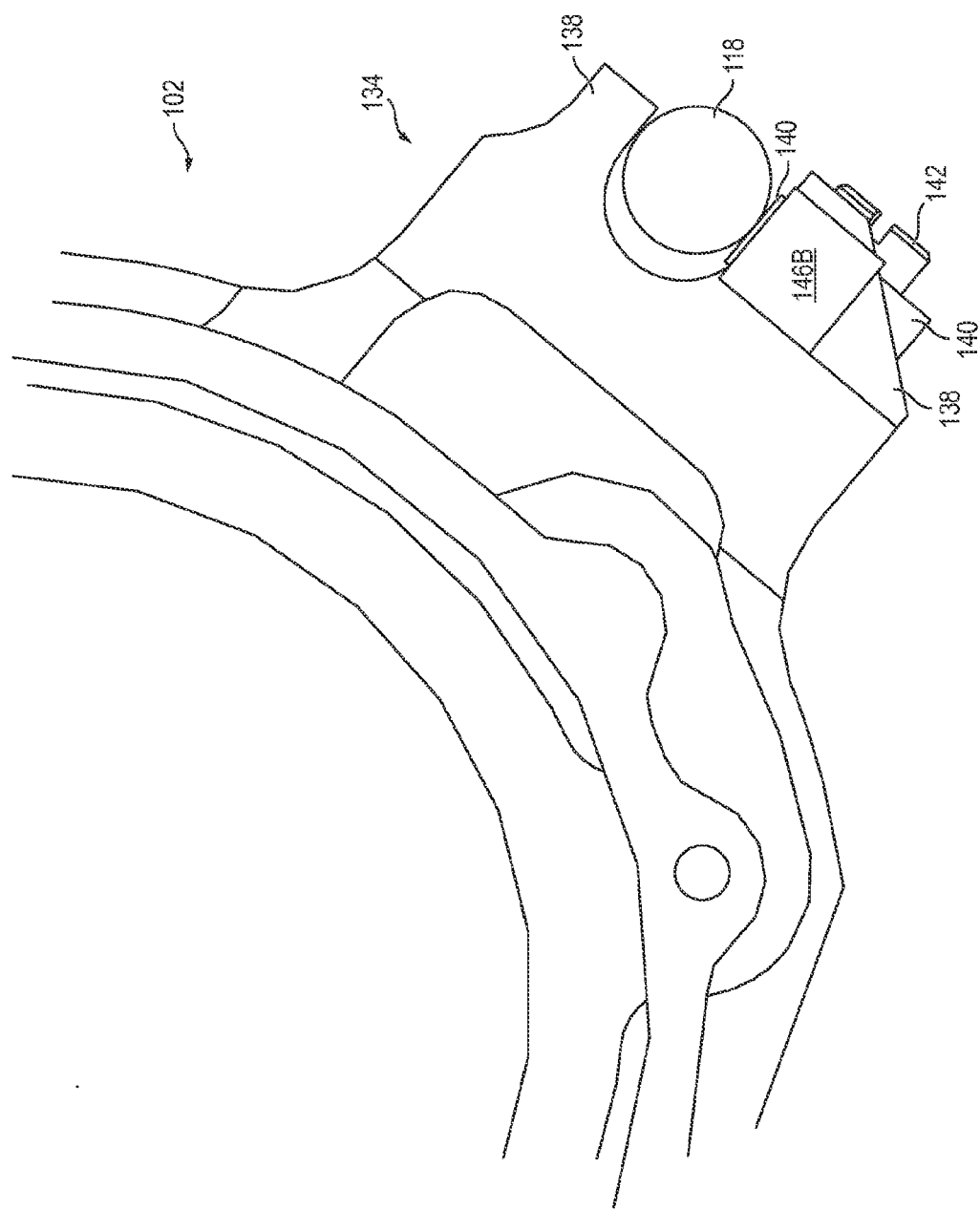
FIG. 7 is a magnified sectional view of a carriage and guiderail portion of the system of FIG. 3, taken at line 7-7 of FIG. 5 and line 7 of FIG. 6.
Figure 8:
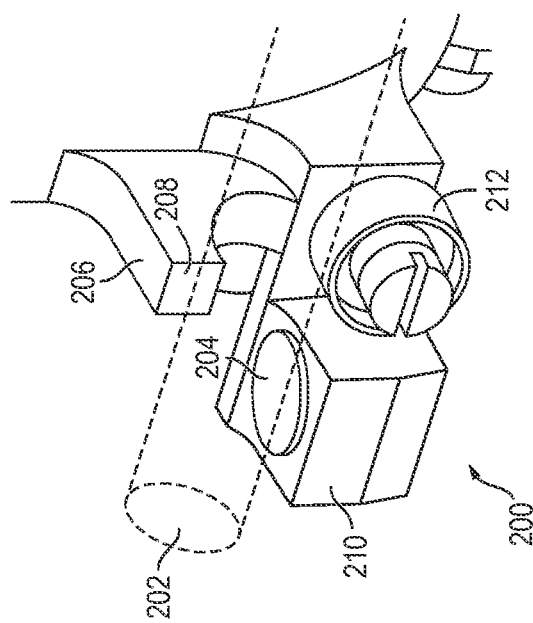
FIG. 8 is an isometric view of the carriage and guiderail portion of the system of FIG. 3.

To keep roller bearing 140 in contact with guiderail 118 and to reduce or eliminate backlash between the carriage and the shaft, magnetic portions such as permanent magnets 146A and 146B (collectively referred to as magnets 146) may be included in carriage assembly 134 (as best shown in FIGS. 7 and 8). FIG. 7 is a sectional view of the carriage assembly and guiderail, and FIG. 8 is an isometric view of the same portion of the system. Magnets 146 may include any suitable magnetic structure or structures configured to attract a ferromagnetic shaft such as guiderail 118. Accordingly, guiderail 118 may comprise a ferromagnetic material such as steel.

In some examples, such as the one best shown in FIG. 8, magnets 146 may include two magnets (146A and 146B) incorporated into carriage assembly 134 and straddling the central roller bearing. In some examples, one or both of magnets 146 may be adjustable toward and/or away from shaft 118. This may be desirable, for example, to adjust the gap between the magnet(s) and the shaft, thereby adjusting the amount of magnetic biasing caused by the magnets. For example, magnets 146 may be tightly but adjustably friction-fit into corresponding openings in jaws 136 and 138.

In some examples, magnets 146 may include cylindrical neodymium magnets. Magnets 146 may be any size that does not interfere with component movement and may be spaced from guiderail 118 at any suitable distance that ensures the guiderail remains in contact with the roller bearing during normal operations. For example, a suitable gap between magnets 146 and shaft 118 may be approximately 0.010 inches to approximately 0.025 inches. As shown in FIG. 7, magnets 146 may have a smaller diameter than shaft 118. In other examples, one or both of magnets 146 may have a substantially identical, or larger diameter than the guiderail.

Similar to guiderail 116, guiderail 118 may be supported at a first or front end portion 148 by a fixed connection to housing 126. For example, front end portion 148 may be bolted directly to a flange or support member of housing 126 by a bolt or cap screw 150. Guiderail 118 may be supported at a second or rear end portion 152 by a support bracket 154. Support bracket 154 may be referred to as a second support bracket. Support bracket 154 may be referred to as a right support bracket, because it is on the right side of the optics system when viewed from the rear. Support bracket 154 may include any suitable mounting structure configured to be mounted to housing 126 and to support an end of guiderail 118. For example, bracket 154 may be bolted to housing 126, as shown in FIG. 6. An aperture 156 in support bracket 154 may be sized and shaped to receive end portion 152. Accordingly, guiderail 118 may be supported radially by bracket 154, while allowing some relative axial motion to accommodate thermal expansion and the like. As shown in FIG. 4, support bracket 154 (and/or 132) may include one or more recesses 158 configured to receive a portion of lens carrier 112 as the lens carrier travels to a rear extent. Recess 158 may be present, for example, if the bracket would otherwise interfere with a portion of lens carrier 112, another lens carrier, and/or another component configured to travel along shafts 116 and/or 118.

Example 2

Alternative Magnetically Preloaded Carriage and Guiderail Assemblies

Figure 9:
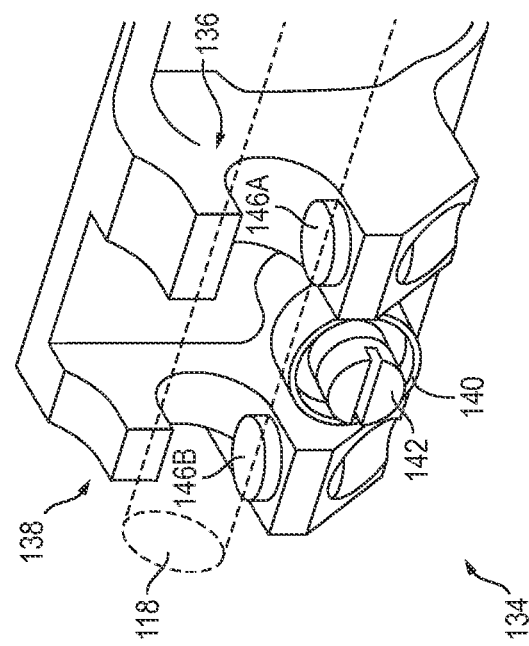
FIG. 9 is an isometric view of another illustrative carriage and guiderail having a single magnet and roller.
Figure 10:
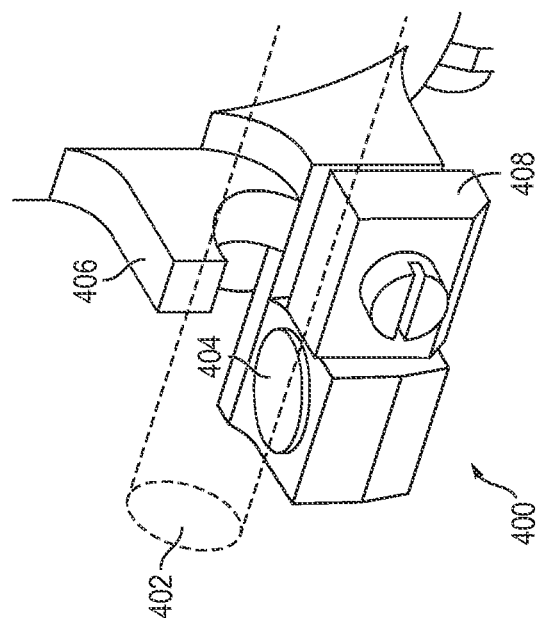
FIG. 10 is an isometric view of another illustrative carriage and guiderail having two magnets and a slide plate.
Figure 11:
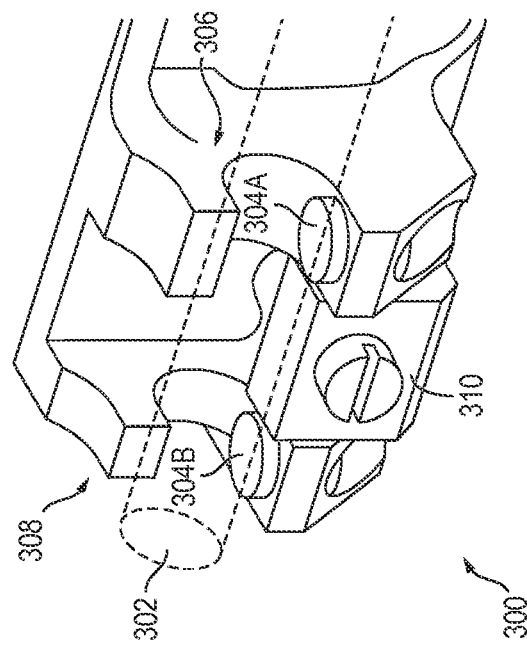
FIG. 11 is an isometric view of another illustrative carriage and guiderail having a single magnet and slide plate.

This example describes additional magnetically preloaded carriage and guiderail assemblies suitable for use in an optics system in accordance with aspects of the present disclosure; see FIGS. 9-11.

FIG. 9 shows an illustrative carriage assembly 200 and associated guiderail 202 suitable for use in an optics system such as system 102. Carriage assembly 200 is similar to carriage assembly 134. However, carriage assembly 200 includes a single magnet 204, and a jaw 206 includes a single finger 208 above (e.g., partially surrounding a circumference of) guiderail 202 and a second projection 210 offset to one side of a roller bearing 212. Magnet 204 is housed in second projection 210. This arrangement may be suitable for use when space constraints do not allow a second magnet and/or jaw to be present.

FIG. 10 shows an illustrative carriage assembly 300 and associated guiderail 302 suitable for use in an optics system such as system 102. Carriage assembly 300 is substantially identical to carriage assembly 134, with the exception of the bearing surface used. Specifically, assembly 300 includes two magnets 304A and 304B, and two jaws 306 and 308, straddling a low-friction slider 310 rather than a roller bearing. Slider 310 may comprise any suitable stationary structure configured to act as a bearing for guiderail 302. For example, slider 310 may include a block comprised of an organic thermoplastic polymer, such as polyether ether ketone (PEEK). PEEK or other stationary sliders may provide added stability when a lens carrier is stationary, as compared to roller bearings.

FIG. 11 shows an illustrative carriage assembly 400 and associated guiderail 402 suitable for use in an optics system such as system 102. Carriage assembly 400 is substantially identical to carriage assembly 200, with the exception of the bearing surface used. Specifically, assembly 400 includes a single magnet 404 and jaw 406, adjacent to a low-friction slider 408 rather than a roller bearing. Slider 408 may comprise any suitable stationary structure configured to act as a bearing for guiderail 402. For example, slider 408 may include a block comprised of PEEK.

Example 3

Multi-Carrier Optics System Having Magnetically Preloaded Guiderail Assemblies

Figure 12:
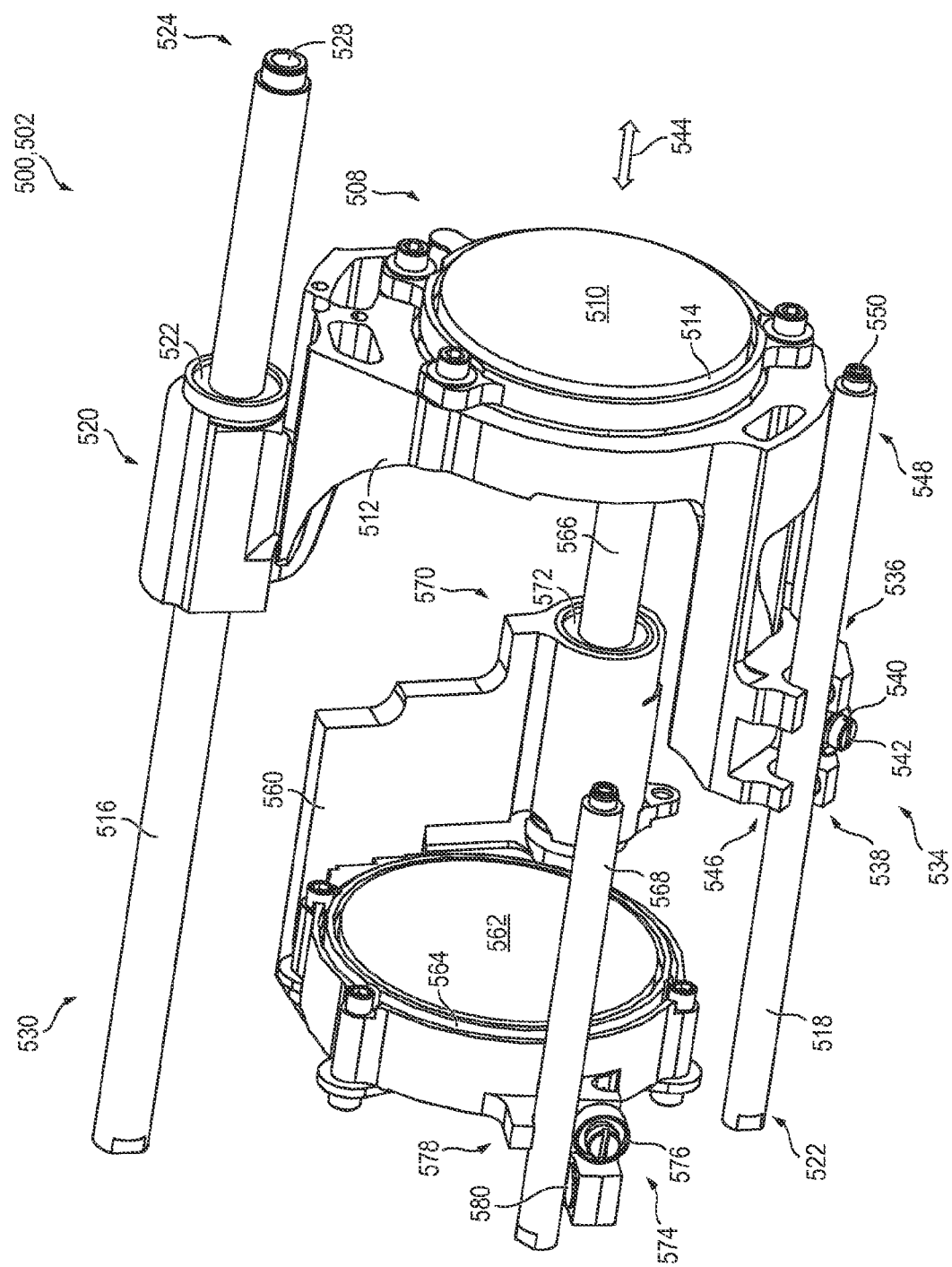
FIG. 12 is an isometric view of a portion of another illustrative optics system, taken from a front-right point of view, and showing two collinear lens carriers and associated guiderails.

This example describes an optics system having two independently movable lens carriers with associated guiderails and magnetically preloaded carriage assemblies; see FIG. 12.

FIG. 12 depicts an optics system 500 similar to optics system 102, and including the components associated with optics system 102, substantially as described above. Like components are identified using similar reference numbers. Specifically, reference numbers in FIG. 12 correspond to the reference numbers used for corresponding components in Example 1, but taking the form "5xx" rather than "1xx." In addition, system 500 includes a second movable optical element in the form of a second lens carrier 560. A second lens 562 is carried by carrier 560 via lens cell 564.

Similar to first lens carrier 512, second lens carrier 560 may include a first guiderail 566 and a second guiderail 568 circumferentially spaced from the first guiderail. A drive mechanism (not shown) may axially reposition lens carrier 560 along the first guiderail. Lens carrier 560 may be operatively connected (i.e., coupled) to the first guiderail by a linear bearing assembly 570, including a bushing 572.

Lens carrier 560 may also include a carriage assembly 574 having a roller bearing 576 and a jaw 578, as well as a magnet portion 580. Carriage assembly 574 may be an example of single-magnet assembly 200 described in Example 2.

Guiderails 566 and 568 may be attached to a housing such as housing 126, with front end portions attached to connection points on the housing and rear end portions retained in a second set of apertures in brackets 132 and 154 (indicated at 582 and 584 in FIG. 6).

First lens carrier 512 and second lens carrier 560 may be shaped and configured such that outer portions of the two carriers can move past each other, thereby bringing lenses 510 and 562 into close proximity to each other. More specifically, as shown in FIG. 12, carriage assembly 534 and carriage assembly 574 will not interfere with each other as they ride on rails 518 and 568, respectively. Likewise, linear bearing assembly 520 and linear bearing assembly 570 are configured to move past each other without interference as lenses 510 and 562 are brought closer to each other. The resulting capability to bring the lenses into adjacency may result in the highest telescopic magnification of the system.

Example 4

Method for Laterally Stabilizing a Movable Optical Component in an Optics System This example describes steps performed in an illustrative method, and may not recite the complete process or all steps of the process. Steps of this method may be performed in conjunction with imaging systems having magnetically preloaded carriage assemblies and guiderails according to aspects of the present disclosure. Although various steps are described below, the steps need not necessarily all be performed, and in some cases may be performed in a different order than the order described.

A first step may include moving an optical element carrier along a first rail, such that a bearing surface on the carrier is in contact with the first rail. For example, as described above, a surface of roller bearing 140 is in contact with guiderail 118 when carriage assembly 134 travels along the guiderail during focusing and/or zoom operation of the lens carrier.

A second step may include biasing the bearing surface against the first rail by attracting the rail toward the carrier using a magnetic portion of the carrier. For example, carriage assembly 134 may include magnets 146, which are configured to attract the ferromagnetic guiderail 118 toward bearing 140.

A third step may include simultaneously moving the carrier along a second rail parallel to the first rail, the carrier being coupled to the second rail by a linear bearing. For example, carrier 112 may be coupled to guiderail 116 by linear bearing assembly 120. Linear bearing assembly 120 may include cylindrical bushing 122. The two guiderails may be disposed on opposite sides of carrier 112, as described above.

A fourth step may include retaining the carrier to the rail using a jaw that laterally surrounds a portion of the rail. For example, jaws 136 and 138 may partially surround guiderail 118, thereby retaining the carrier to the rail.

Example 5

Selected Embodiments

This section describes additional aspects and features of imaging systems and optics systems having magnetically preloaded carriage and guiderail assemblies, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An imaging system comprising: (i) a carrier assembly including an optical element and coupled to a first guiderail by a linear bearing; (ii) a second guiderail spaced from and parallel to the first guiderail, the carrier assembly coupled to the second guiderail by a carriage assembly having a jaw portion at least partially surrounding the second guiderail, a bearing configured to contact the second guiderail, and a magnetic portion configured to bias the bearing against the guiderail; wherein the carrier assembly is movable along the first and second guiderails.

A1. The imaging system of A0, further including a housing, the first and second guiderails being attached to the housing such that the carrier assembly is movable relative to the housing.

A2. The imaging system of A1, wherein the housing comprises a portion of a payload in a gimbal system.

A3. The imaging system of A1, wherein each of the first and second guiderails is affixed at a respective first end portion to a respective connection point of the housing.

A4. The imaging system of A3, wherein each of the first and second guiderails is attached at a respective second end portion to the housing by a respective first and second mounting bracket.

A5. The imaging system of any one of paragraphs A0-A5, wherein the bearing includes a roller bearing rotatably connected to the carriage assembly.

A6. The imaging system of any one of paragraphs A0-A5, wherein the bearing includes a polymer block affixed to the carriage assembly.

A7. The imaging system of any one of paragraphs A0-A5, wherein the magnetic portion includes a pair of magnets straddling the bearing.

A8. The imaging system of any one of paragraphs A0-A5, wherein the magnetic portion comprises a permanent magnet.

A9. The imaging system of any one of paragraphs A0-A5, wherein the jaw portion includes a pair of protrusions partially surrounding the second guiderail.

A10. The imaging system of A8, the magnetic portion including a pair of magnets straddling the bearing, the pair of protrusions being disposed directly opposite the pair of magnets.

B0. An optics system comprising: (i) a carrier supporting an optical element and a carriage assembly attached to a periphery of the lens carrier; and (ii) a guide shaft, the lens carrier being coupled to the guide shaft by the carriage assembly; wherein the carriage assembly includes a bearing and a magnetic portion configured to bias the bearing against the guide shaft.

B1. The system of B0, wherein the guide shaft comprises a ferromagnetic material.

B2. The system of B1, wherein the magnetic portion includes a permanent magnet coupled to the carriage assembly adjacent to the bearing, the magnet being oriented to attract the guide shaft.

B3. The system of any one of paragraphs B0-B2, the guide shaft being a first guide shaft, the system further including a second guide shaft parallel to the first guide shaft, the lens carrier being coupled to the second guide shaft.

B4. The system of any one of paragraphs B0-B3, wherein the magnetic portion is adjustable toward and away from the guide shaft.

B5. The system of any one of paragraphs B0-B4, the carriage assembly further including a set of jaws adjacent to the guide shaft, a first jaw passing partially around a circumference of the guide shaft and an opposing second jaw retaining the magnetic portion adjacent to the guide shaft.

B6. The system of any one of paragraphs B0-B5, wherein the bearing comprises a roller bearing coupled to the carriage assembly adjacent to the magnetic portion.

B7. The system of any one of paragraphs B0-B6, wherein the magnetic portion comprises a plurality of permanent magnets.

C0. A method for laterally stabilizing a movable component in an optics system, the method comprising (i) moving an optical element carrier along a first rail, such that a bearing surface on the carrier is in contact with the first rail; and (ii) biasing the bearing surface against the first rail by attracting the rail toward the carrier using a magnetic portion of the carrier.

C1. The method of C0, further including simultaneously moving the carrier along a second rail parallel to the first rail, the carrier being coupled to the second rail by a linear bearing.

C2. The method of C1, wherein the linear bearing comprises a cylindrical bushing laterally surrounding the second rail.

C3. The method of C1, wherein the second rail is disposed on an opposite side of the first rail.

C4. The method of any one of paragraphs C0-C3, further including retaining the carrier to the rail using a set of jaws that laterally surround a portion of the rail.

VIII. Advantages, Features, Benefits

The different embodiments of the optics system having a magnetically preloaded carriage and guiderail described herein provide several advantages over known solutions for reducing lateral backlash in imaging systems. For example, illustrative embodiments described herein allow most or all lateral backlash to be taken up by the magnetic force pulling the roller bearing or slider against the rail. Additionally, and among other benefits, illustrative embodiments described herein may involve no contact between the guiderail and the preloading element (e.g., magnetic portion), thereby reducing wear and friction. Certain embodiments include two guiderails per lens carrier, with one of the guiderails providing a preloaded bearing. In some embodiments, preloading can be easily adjusted by changing the gap between the magnet and the shaft. No known system or device can perform these functions, particularly not to the level necessary in a high precision system. Thus, the illustrative embodiments described herein are particularly useful for use in gimbal systems. However, not all embodiments described herein provide the same advantages or the same degree of advantage.

Conclusion

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure

The invention claimed is:

1. An optics system comprising:
a lens carrier supporting an optical element and a carriage assembly attached to a periphery of the lens carrier, the carriage assembly including a roller bearing rotatably connected to the carriage assembly, and a magnetic portion adjacent to the roller bearing; and
a guide shaft, the lens carrier being coupled to the guide shaft by the carriage assembly, the magnetic portion configured to bias the roller bearing against the guide shaft, such that the lens carrier is movable along the guide shaft with the roller bearing rotating in continuous contact with the guide shaft.

2. The system of claim 1, wherein the guide shaft comprises a ferromagnetic material.

3. The system of claim 2, wherein the magnetic portion includes a permanent magnet coupled to the carriage assembly adjacent to the roller bearing, the magnet being oriented to attract the guide shaft.

4. The system of claim 1, the guide shaft being a first guide shaft, the system further including a second guide shaft parallel to the first guide shaft, the lens carrier being coupled to both the first guide shaft and the second guide shaft.

5. The system of claim 1, wherein the magnetic portion is adjustable toward and away from the guide shaft.

6. The system of claim 1, the carriage assembly further including a set of jaws adjacent to the guide shaft, a first jaw passing partially around a circumference of the guide shaft and an opposing second jaw retaining the magnetic portion adjacent to the guide shaft.

7. The system of claim 1, wherein the magnetic portion comprises a plurality of permanent magnets.

8. An imaging system comprising:
a carrier assembly including an optical element and coupled to a first guiderail by a linear bearing;
a second guiderail spaced from and parallel to the first guiderail, the carrier assembly coupled to the second guiderail by a carriage assembly having a jaw portion at least partially surrounding the second guiderail, a roller bearing rotatably connected to the carriage assembly and configured to contact the second guiderail, and a magnetic portion configured to bias the roller bearing against the second guiderail;
wherein the carrier assembly is movable along the first and second guiderails with the roller bearing rotating in substantially continuous contact with the second guiderail.

9. The imaging system of claim 8, further including a housing, the first and second guiderails being attached to the housing such that the carrier assembly is movable relative to the housing.

10. The imaging system of claim 9, wherein the housing comprises a portion of a payload in a gimbal system.

11. The imaging system of claim 8, wherein the magnetic portion includes a pair of magnets straddling the roller bearing.

12. The imaging system of claim 8, wherein the magnetic portion comprises a permanent magnet.

13. The imaging system of claim 8, wherein the jaw portion includes a pair of protrusions partially surrounding a circumference of the second guiderail.

14. A method for laterally stabilizing a movable component in an optics system, the method comprising:
moving an optical element carrier along a first rail, such that a roller bearing rotatably connected to the carrier is in contact with the first rail; and
biasing the roller bearing surface against the first rail by attracting the rail toward the carrier using a magnetic portion of the carrier, such that the roller bearing rotates in continuous contact with the first rail as the carrier moves along the first rail.

15. The method of claim 14, further including simultaneously moving the carrier along a second rail parallel to the first rail, the carrier being coupled to the second rail by a linear bearing.

16. The method of claim 15, wherein the linear bearing comprises a cylindrical bushing laterally surrounding the second rail.

17. The method of claim 15, wherein the second rail is disposed on an opposite side of the first rail.

18. The method of claim 14, further including retaining the carrier to the first rail using a jaw that laterally surrounds a portion of the first rail.

* * * * *